(12) United States Patent
Nestorovic et al.

(10) Patent No.: US 7,854,523 B2
(45) Date of Patent: *Dec. 21, 2010

(54) OPTICAL RELAY FOR COMPACT HEAD UP DISPLAY

(75) Inventors: Nenad Nestorovic, Seattle, WA (US); Joel E. Hegland, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/490,959

(22) Filed: Jun. 24, 2009

(65) Prior Publication Data

US 2010/0053753 A1 Mar. 4, 2010

Related U.S. Application Data

(63) Continuation-in-part of application No. 12/198,770, filed on Aug. 26, 2008, now Pat. No. 7,690,799.

(51) Int. Cl.
*G02B 27/00* (2006.01)
*G02B 27/01* (2006.01)

(52) U.S. Cl. .......................... 359/601; 359/738

(58) Field of Classification Search ......... 359/601–608, 359/630, 738–740
See application file for complete search history.

(56) References Cited

U.S. PATENT DOCUMENTS

| 4,261,647 A | 4/1981 | Ellis | |
|---|---|---|---|
| 7,690,799 B2* | 4/2010 | Nestorovic et al. | 359/601 |
| 2007/0097513 A1* | 5/2007 | Amitai | 359/630 |

FOREIGN PATENT DOCUMENTS

| JP | 05-341226 | 12/1993 |
|---|---|---|
| JP | 2006-103589 | 4/2006 |
| KR | 10-0813493 | 3/2008 |
| KR | 10-0820898 | 4/2008 |

* cited by examiner

*Primary Examiner*—Darryl J Collins
(74) *Attorney, Agent, or Firm*—Kevin D. Wills

(57) ABSTRACT

An optical relay (500) includes a glare trap (512) that in one embodiment has one or more surfaces configured to reflect light impinging the surface (550) at an angle less than a first angle (722) relative to a normal line (710), and to transmit light impinging the surface (550) at an angle greater than a second angle (723) relative to the normal line (710). In other embodiments, the glare trap (512) reflects light impinging at an angle greater than a first angle and transmit light impinging at an angle that is less than a second angle. The separation between the first angle (722) and second angle (723) can be on the order of 20 degrees or more, but this angle can be reduced or eliminated when polarized light is used within the optical relay (500).

24 Claims, 9 Drawing Sheets

OPTICAL RELAY FOR COMPACT HEAD UP DISPLAY

CROSS REFERENCE TO PRIOR APPLICATIONS

This application is a continuation-in-part of U.S. application Ser. No. 12/198,770, now U.S. Pat. No. 7,690,799, filed on Aug. 26, 2008, which is incorporated by reference for all purposes.

BACKGROUND

1. Technical Field

This invention relates generally to optical relays for head up displays and the head up displays employing such optical relays, and more particularly to an optical relay having reflective properties at certain angles of incidence relative to surfaces of the optical relay and transmissive properties at other angles of incidence relative to the surfaces.

2. Background Art

Head up displays are typically deployed in vehicles such as automobiles or aircraft to allow the driver or pilot to view information projected by the display without requiring the driver or pilot to divert his view away from the outside environment. Head up displays employ optical relays to direct light from a projection source to a viewer's eye. The optical relay design for head up displays typically magnifies the image generated by the projection source, such as a scanning display, liquid crystal display (LCD), or other projection source. The optical relay then places the magnified image such that it is optically perceived at some distance outside the vehicle or aircraft. For example, in some applications the head up display will present an image that appears to the viewer to be, for example, around one and a half meters away from the operator and outside the vehicle or aircraft.

To provide the proper magnification, the optical relay can require a sufficient optical path length. A certain amount of minimum length can be needed in some applications for the optics within the head up display to suitably magnify the image. This needed optical path length can provide a design constraint on the physical size of the head up display, in that the form factor of the head up display must be larger than may be desired to achieve the proper magnification of the projected image. Reduction in the overall size of prior art head up displays can be further limited by other optical requirements including eyebox size, field of view, and/or distance of apparent image location.

There is thus a need for an optical relay and head up display capable of delivering adequate optical path length in a reduced form factor.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
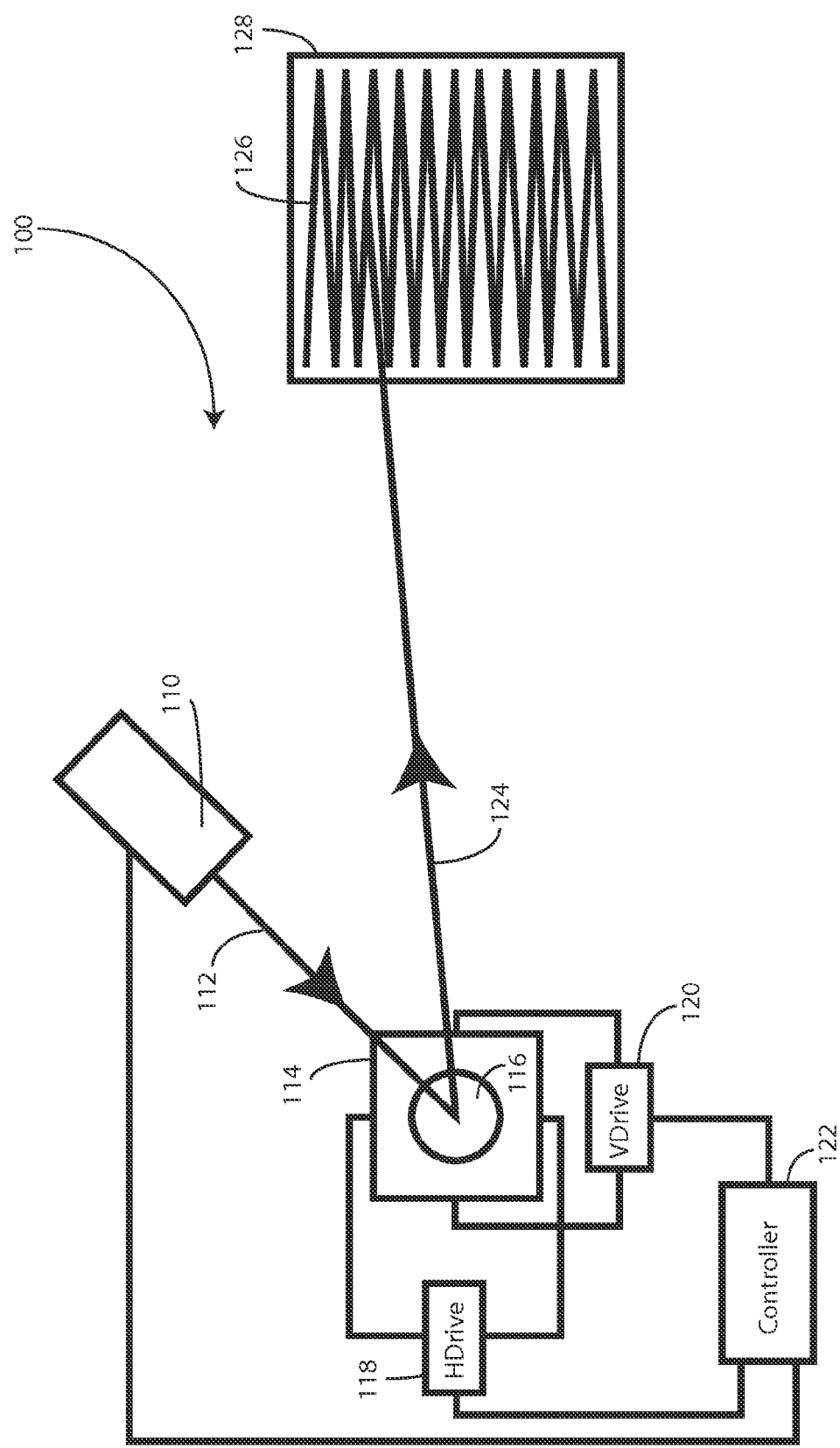
FIG. 1 is an illustrative diagram of a microelectromechanical system (MEMS) based scanned beam display, suitable for use with a head up display in accordance with one or more embodiments of the invention.

Skilled artisans will appreciate that elements in the figures are illustrated for simplicity and clarity and have not necessarily been drawn to scale. For example, the dimensions or relative angles of some of the elements in the figures may be exaggerated or repositioned relative to other elements to help to improve understanding of embodiments of the present invention.

DETAILED DESCRIPTION OF THE INVENTION

Apparatus components and method steps have been represented herein where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. In this document, relational terms such as first and second, top and bottom, and the like may be used solely to distinguish one entity or action from another entity or action without necessarily requiring or implying any actual such relationship or order between such entities or actions.

It will be appreciated that embodiments of the invention described herein may be comprised of one or more conventional processors and unique stored program instructions that control the one or more processors to implement, in conjunction with certain non-processor circuits, some, most, or all of the functions of generating an image with a projection source and delivering the image as a head up display through an optical relay as described herein. The non-processor circuits may include, but are not limited to, signal drivers, clock circuits, power source circuits, and user input devices. As such, these functions may be interpreted as steps of a method to perform the delivery of the image to the user. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a" "an," and "the" includes plural reference, the meaning of "in" includes "in" and "on." Also, reference designators shown herein in parenthesis indicate components shown in a figure other than the one in discussion. For example, talking about a device (10) while discussing FIG. A would refer to an element, 10, shown in figure other than FIG. A.

Figure 2:
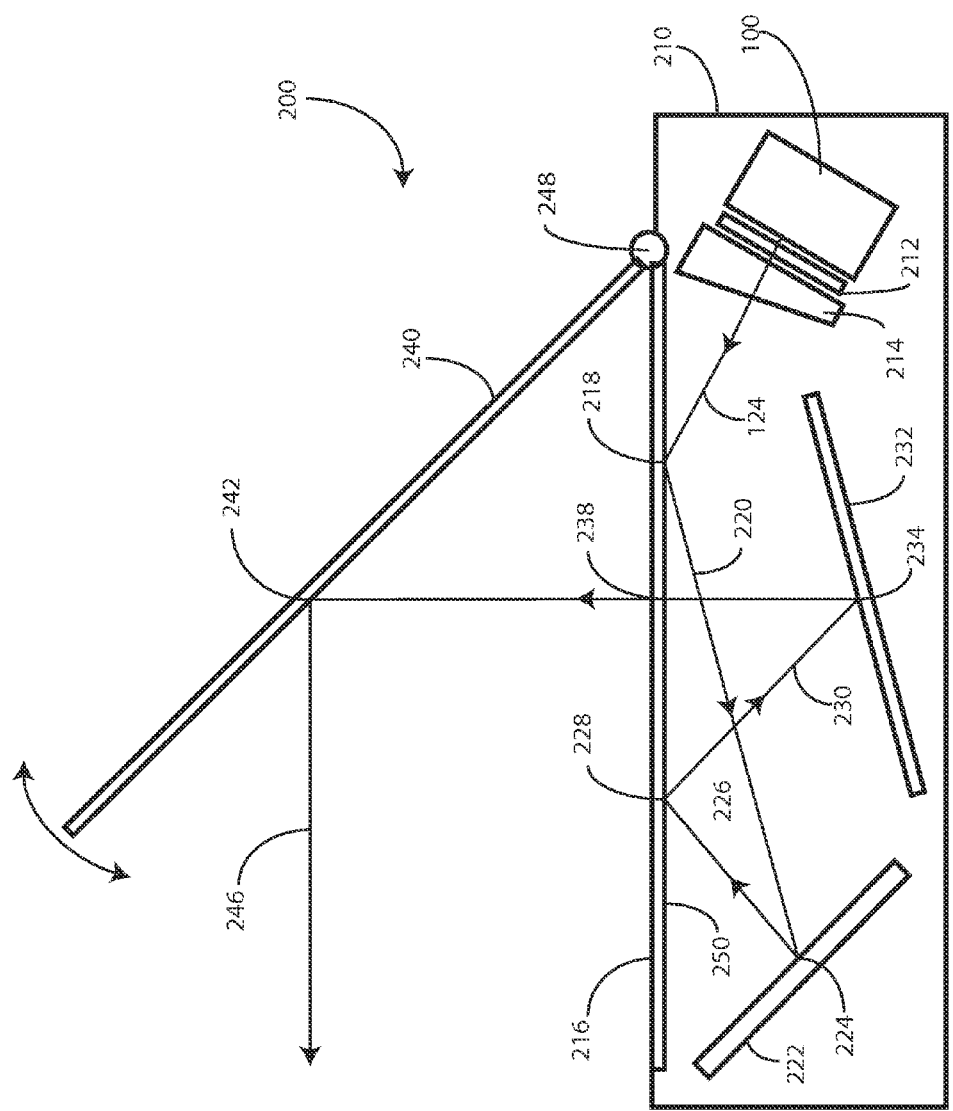
FIG. 2 is an illustrative diagram of one optical relay suitable for use in a compact head up display in accordance with one or more embodiments of the invention.
Figure 3:
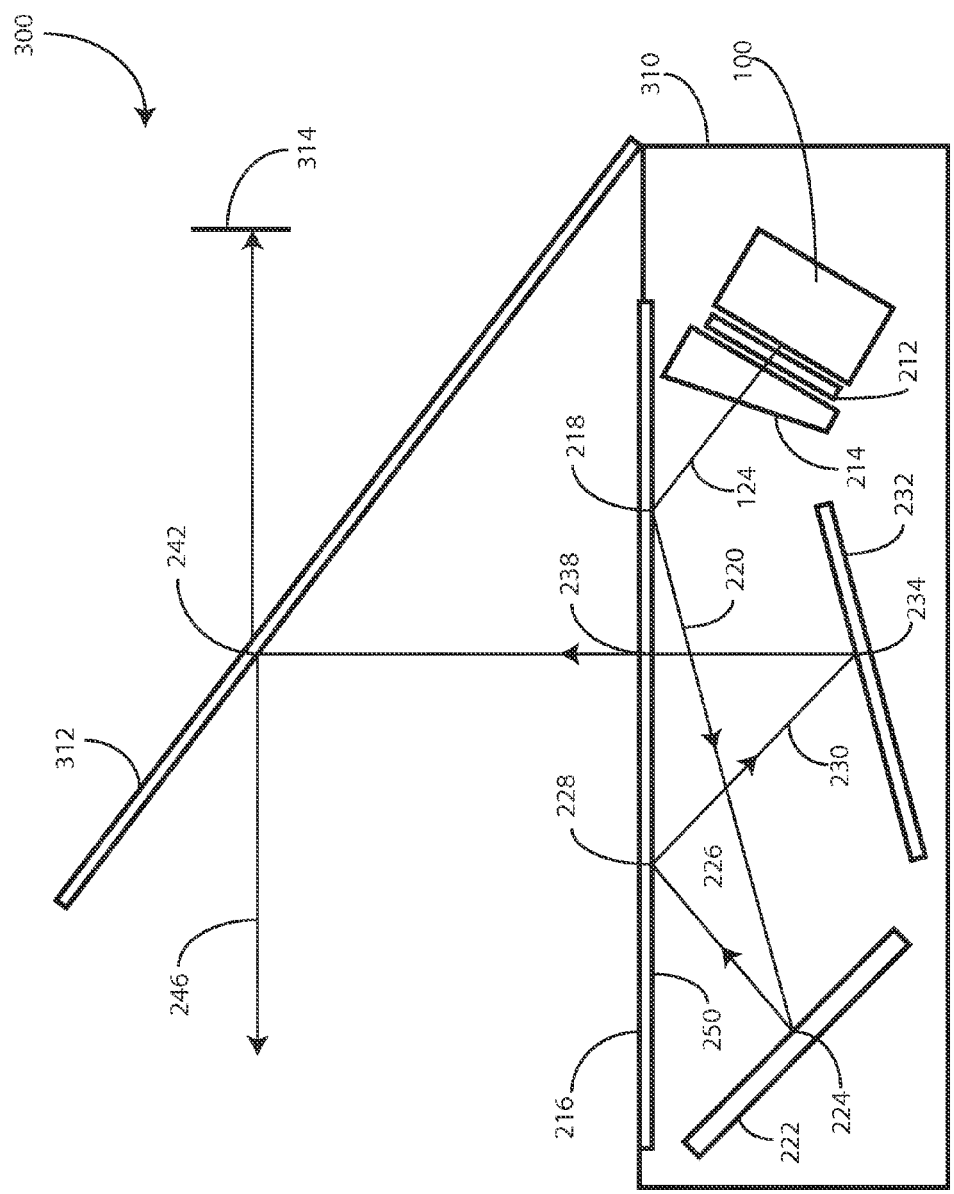
FIG. 3 is an illustrative diagram of another optical relay suitable for use in another compact head up display in accordance with one or more embodiments of the invention.

Turning now to FIG. 1, illustrated therein is a diagram of an exemplary projection source suitable for use with embodiments of the invention. The illustrative projection source shown in FIG. 1 is a microelectromechanical system (MEMS) based laser scanned beam display. While a MEMS scanned display will be used herein for illustrative purposes, it will be clear to those of ordinary skill in the art having the benefit of this disclosure that the invention is not so limited. As will be shown below, the illustrative scanned beam display 100 of FIG. 1 may be used with an optical relay in a head up display as shown in FIG. 2 or FIG. 3. It should also be noted that although a scanned beam display 100 is shown in FIG. 1 as an example display module for a head up display as discussed herein, other types of displays such as a liquid crystal display (LCD), liquid crystal on silicon (LCOS) display, or a digital light projector (DLP) may be substituted for the scanned beam display 100, and the scope of the claimed subject matter is not limited in this respect.

As shown in FIG. 1, the scanned beam display 100 comprises a light source 110, which may be a laser light source such as a semiconductor laser or the like. The light source 110 is capable of emitting a beam 112. Where the light source 110 is a laser, the beam 112 will comprise a laser beam. In some embodiments, light source may comprise two or more light sources, such as in a color system having red, green, and blue light sources, where the beams from the light sources may be combined into a single beam.

The beam 112 impinges on a scanning platform 114, which may comprise a MEMS based scanner having a scanning mirror 116 or the like. The beam 112 then reflects off of the modulating scanning mirror 116 to generate a controlled output beam 124. In one or more alternative embodiments, rather than being a MEMS based scanner, the scanning platform 114 or the source of the display image may be replaced with other devices such as a diffractive optic grating, a moving optic grating, a light valve, a rotating mirror, a spinning silicon device, a digital light projector device, a flying spot projector, or a liquid-crystal on silicon device, or other similar scanning devices.

A horizontal drive circuit 118 and vertical drive circuit 120 modulate the direction in which scanning mirror 116 is deflected. In one embodiment, this modulation is configured to cause controlled output beam 124 to generate a raster scan 126, sweeping both horizontally and vertically across a projection surface or image plane. The raster scan 126 thereby creates a displayed image 128 on the projection surface or image plane.

In one embodiment, a display controller 122 controls the horizontal drive circuit 118 and the vertical drive circuit 120 by converting pixel information stored in memory or otherwise transmitted to the display controller 122 into laser modulation corresponding to an image. The laser modulation, in one embodiment, is synchronous to the scanning platform 114 and writes the image information as displayed image 128 based upon the position of the controlled output beam 124 in the raster scan 126 and the corresponding intensity and/or color information at the corresponding pixel in the image. Display controller 122 may also control other various functions of the scanned beam display 100 as well.

In one or more embodiments, such as for two dimensional scanning to generate a two dimensional image, a "fast scan axis" may refer to the horizontal direction of the raster scan 126, while a "slow scan axis" may refer to the vertical direction of raster scan 126. (Note that the terms "horizontal" and "vertical" are used relative to the orientation shown in FIG. 1, and may be rotated by ninety degrees without changing the operation of the overall system.) The scanning mirror 116 may sweep the controlled output beam 124 horizontally at a relatively higher frequency and also vertically at a relatively lower frequency. The result is a scanned trajectory of controlled output beam 124 creating the raster scan 126. While a raster scan 126 is one method of creating an image, it will be clear to those of ordinary skill in the art having the benefit of this disclosure that the invention is not so limited. Other image generation patterns, scans, and pixel presentations can be used to create the image as well.

Turning now to FIG. 2, illustrated therein is a diagram of an optical relay 200 suitable for use in a compact head up display in accordance with one or more embodiments of the invention. In one or more embodiments, the optical relay 200 comprises a housing 210 in which the scanned beam display 100 may be disposed. Alternatively, as noted above, the scanned beam display 100 may be substituted with a liquid crystal display (LCD), a liquid crystal on silicon (LCOS) display, a digital light projector (DLP) display, and so on, and the scope of the claimed subject matter is not limited in this respect.

In one or more embodiments, the light or controlled output beam 124 emitted from the scanned beam display 100 may pass through a singlet lens 212 and/or a wedge 214. In one or more embodiments, the singlet lens 212 may be used to ensure a flat field and/or that the eyebox is correctly positioned relative to the overall optical relay 200. The wedge 214 may be used to provide distortion correction such as correction of smile distortion and/or chromatic aberration. However in some embodiments, the singlet lens 212 and/or the wedge 214 may be optional. Further, the singlet lens 212 and/or the wedge 214 may not be utilized in some applications.

In one or more embodiments, the light or controlled output beam 124 may comprise monochromatic light. Alternatively, the light or controlled output beam 124 may comprise polychromatic light, such as red (R), green (G), and blue (B) light. As is known in the art, red, green, and blue light can be used to represent a full color image projected by scanned beam display 100. The scope of the claimed subject matter is not limited with respect to the type of light comprising the light or controlled output beam 124.

Figure 8:
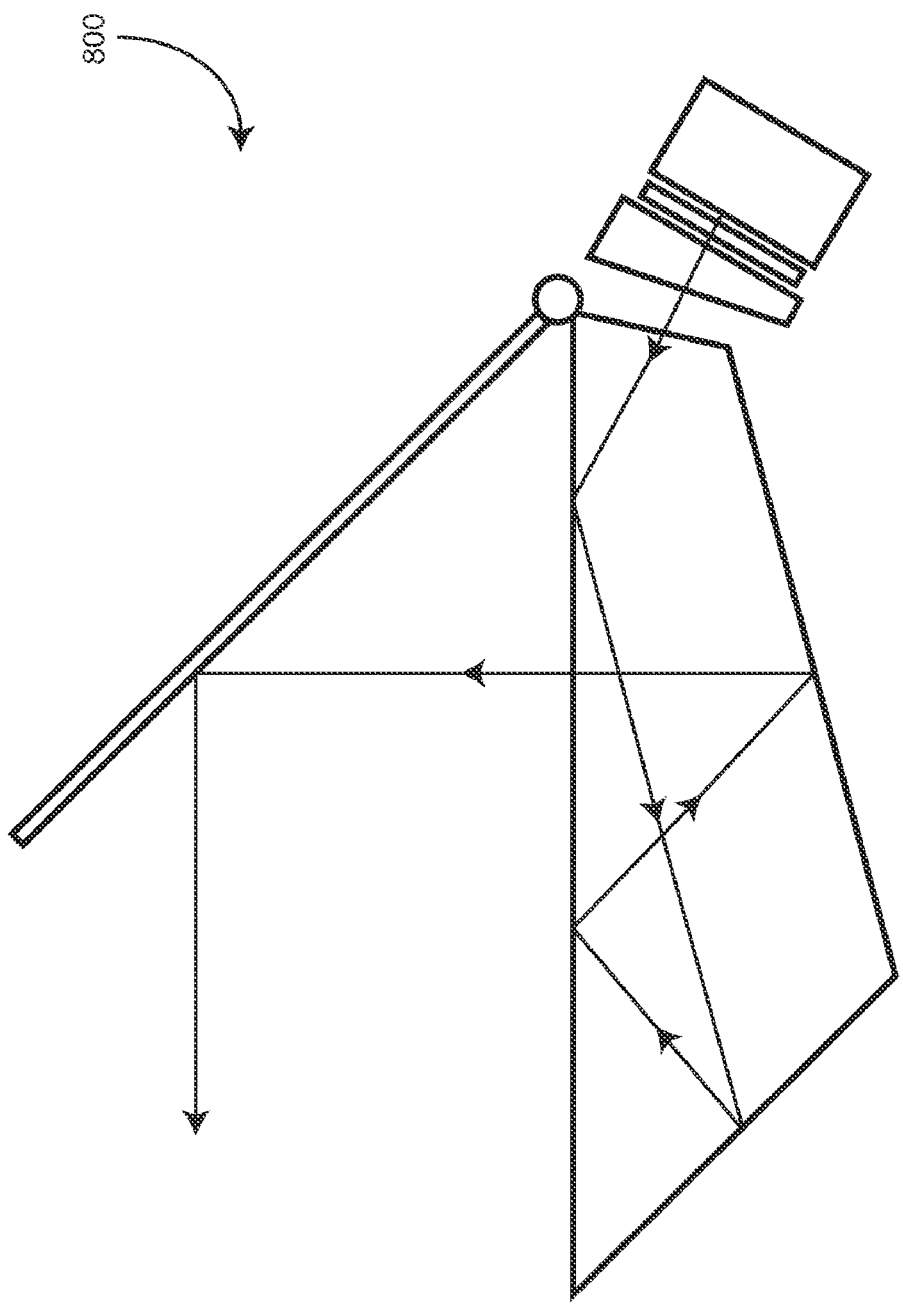
FIG. 8 is an illustrative diagram of an alternative glare trap suitable for use as an optical relay in a compact head up display in accordance with one or more embodiments of the invention.

In one or more embodiments, the controlled output beam 124 impinges on a surface 250 of the glare trap 216. In one embodiment, this surface 250 can be the outside surface or face of a of a monolithic piece of optical material, such as glass, as the optical relay 200 can essentially be formed from a single piece of optical material with the scanned beam display 100 disposed so as to project light into the single piece of optical material. For example the reflective components and light transmission paths within the housing 210, or the housing 210 itself, can be manufactured from a single piece of glass, plastic, or other optically transparent material. In such a configuration, the glare trap 216, the primary optic 232 and the secondary optic 222 can be manufactured from surfaces of the single monolithic piece of optical material. One such embodiment 800 is shown in FIG. 8.

In such an embodiment, the scanned beam display 100 could be located externally relative to the single monolithic piece of optical material. The scanned beam display 100 and the single monolithic piece of optical material may then be placed within the housing 210 so as to protect both the single monolithic piece of optical material and the scanned beam display 100. In other embodiments, a housing 210 would not be required. Where used, the singlet lens 212 and/or the wedge 214 could either be formed into the single monolithic piece of optical material or else disposed outside the optical material along with the scanned beam display 100. Where the single monolithic piece of optical material is employed, the surfaces forming the glare trap 216, the primary optic 232, and the secondary optic 222 may have optical coating disposed thereon. The optical coating, as will be described in more detail below, is used to provide the angular selectivity employed by the optical relay.

While the housing 210 can be manufactured from a single monolithic piece of optical material, in some applications it will be easier to build the optical relay 200 from constituent parts. In one embodiment, where constituent parts are used to construct the optical relay 200, the glare trap 216 may comprise a pane of glass, plastic, or other transparent material. The glare trap 216 may be relatively flat or planar in one or more embodiments, and may have some curvature on one or more surfaces in one or more alternative embodiments.

As noted above and as will be discussed in further detail with respect to FIG. 4, below, the glare trap 216 may have an optical coating disposed thereon that functions as an angularly selective coating or filter. A suitable optical coating may comprise a multilayer, thin film, dielectric coating that includes materials such as magnesium fluoride. In certain coatings, such as the coatings described with respect to FIGS. 5-7 below, the layers may be thicker and the layers may have indices of refraction that differ from each other by varying amounts. The coatings provide angular selectivity as described herein. As is known in the art, many optic coating manufacturers are capable of receiving reflective and transmissive requirements associated with an application and delivering a coating tailored to those requirements. For instance, exemplary coatings may be obtained from optical product suppliers such as Cascade Optical Corporation of Santa Ana, Calif., USA or Deposition Sciences Inc of Santa Rosa, Calif., USA.

In one or more embodiments, where such a coating is disposed on the surface 250 of the glare trap 216, the coating allows the glare trap 216 to be utilized as an optical surface in optical relay 200 multiple times. In the illustrative embodiment of FIG. 2, three times is shown as an example. However, it will be clear to those of ordinary skill in the art having the benefit of this disclosure that the invention is not so limited. The application, coating, and physical design of the optical relay 200 will determine how many times the optical surface is used.

The coating of the glare trap 216 reflects light that is incident on surface the 250, in one embodiment, that is greater than a first angle relative to a normal from that surface. For example, in one embodiment the angle is greater than about 37 degrees from a line normal, where the line normal to the surface 250 of the glare trap 216 has a value of zero degrees.

The coating of the glare trap 216 may also efficiently transmit light that is incident on the surface 250 of the glare trap 216 at angles that are less than a second angle relative to the normal, such as an angle within about ten degrees of the normal. Said differently, the coating can be configured to transmit light that is incident upon the surface 250 at an angle of less than about 10 degrees from the normal.

In one or more embodiments, the first angle and the second angle have a separation of at least about 20 degrees or more. Such a relatively large angular separation between the first angle and the second angle between light that is reflected and light that is transmitted via operation of the coating may be designed to operate over a relatively wide range of wavelengths, for example to accommodate multiple wavelength content in controlled output beam 124 such as where light beam comprises RGB light, although the scope of the claimed subject matter is not limited in this respect.

Where the light being reflected and transmitted is polarized, the first angle and second angle can have a smaller separation, such as about ten degrees or more. For example, where light incident to the surface 250 at angles that are greater than the first angle are substantially s-polarized, the coating can be designed with a smaller separation angle while still functioning as an angularly selective coating or filter. This will be described in more detail in FIG. 4. Where the light incident to the surface 250 at angles that are greater than the first angle is substantially s-polarized light, the light incident to the surface 250 at angles less than the second angle can generally be either substantially p-polarized or s-polarized. Predominantly p-polarized light will be frequently be used for transmission through the glare trap 216, while predominantly s-polarized light will be used for reflection, as these polarizations lend themselves to thinner, less expensive optical coatings. However, predominantly s-polarized light can be used for transmission in addition to being used for reflection. Note also that where polarized light is employed, the glare trap 216 may include a polarizer integrated therein or disposed adjacent therewith.

As shown in FIG. 2, the controlled output beam 124 emitted by the scanned beam display 100 impinges on the surface 250 of the glare trap 216 at location 218. The controlled output beam 124 impinges, in the embodiment of FIG. 2, at an angle greater than the first angle, which may be 37 degrees in one or more embodiments. As a result, the controlled output beam 124 is reflected off the surface 250 of the glare trap 216 as reflected beam 220, where it is directed to a secondary optic 222. The secondary optic 222 may be substantially planar. Alternatively, the secondary optic 222 may have some curvature to its shape and may comprise a curved mirror surface to provide focusing and/or magnification of the projected image. The secondary optic 222 may comprise any suitable optical element such as a mirror or a lens, and the scope of the claimed subject matter is not limited in this respect.

The reflected beam 220 impinges on the secondary optic 222 at location 224. The beam is then redirected back toward glare trap 216 as reflected beam 226. Reflected beam 226 impinges on the surface 250 of the glare trap 216 at location 228 at an angle that is greater than the first angle, and is therefore reflected by the coating on the surface 250 as reflected beam 230. Reflected beam 230 then impinges on the primary optic 232 at location 234 and is redirected back toward the glare trap 216 as light beam 236. As with the secondary optic 222, the primary optic 232 may also have a curved shape or planar shape, and in one embodiment comprises a curved mirror surface to provide focusing and/or magnification of the projected image. The primary optic 232 may comprise any suitable optical element such as a mirror or a lens, and the scope of the claimed subject matter is not limited in this respect. As the light beam 236 impinges on the surface 250 of the glare trap 216 at location 238 at an angle equal to or less than the second angle, which may be 10 degrees in one or more embodiments, light beam 236 is allowed to efficiently pass through the coating disposed on surface 250 of glare trap 216 and exits housing 210.

After the light beam 236 exits the housing 210, the light beam 236 may impinge on a combiner 240 at location 242 and be redirected toward the eye of the operator in the head up display eyebox as beam 246. The combiner 240 allows the image relayed by the optical relay 200 to be combined with light incoming to the operator's eye from the ambient environment such as light entering into the vehicle from the outside of the vehicle. As noted above, in one embodiment, the combiner 240 may have some curvature in shape to provide focusing and/or magnification of the projected image.

In one or more embodiments, the combiner 240 may be coupled to the housing 210 of the optical relay 200 via a hinge 248. The hinge 248 allows the angle of the combiner 240 be adjusted to an optimum or near optimum angle according to the operator's preference. Likewise, such an arrangement of the combiner 240, the housing 210, and the hinge 248 allows the optical relay 200 of the head up display to be contained in a compact form factor suitable for after market installation or use. For example, the housing 210 may be disposed on or integrated into a dashboard of a vehicle in the vehicle's interior space, although the scope of the claimed subject matter is not limited in this respect. An alternative arrangement of an optical relay for a head up display that is integrated into a vehicle is shown in and described with respect to FIG. 3 below.

Turning now to FIG. 3, illustrated therein is a diagram of an optical relay 300 for an alternative compact head up display in accordance with one or more embodiments of the invention. In one or more embodiments, the optical relay 300 of FIG. 3 may be substantially similar to optical relay (200) of FIG. 2, except that the components of the optical relay 300 may be disposed within a dashboard 310 of the vehicle or similar location. In such a configuration, the windshield 312 of the vehicle may function as the combiner 240 of FIG. 2, or alternatively the combiner 240 can be integrated with or otherwise disposed in or on the windshield 312.

Furthermore, FIG. 3 illustrates that the optical relay 300 may function to place the apparent image 314 projected by the scanned beam display 100—via optical relay 300—at a location outside of the windshield 312. By way of example, this distance can be about 1.5 meters from the operator/viewer. It should be noted that the optical relay (200) of FIG. 2 may likewise place the apparent image at a selected distance from the operator/viewer, as shown in FIG. 3 with optical relay 300, and the scope of the claimed subject matter is not limited in this respect.

Figure 4:
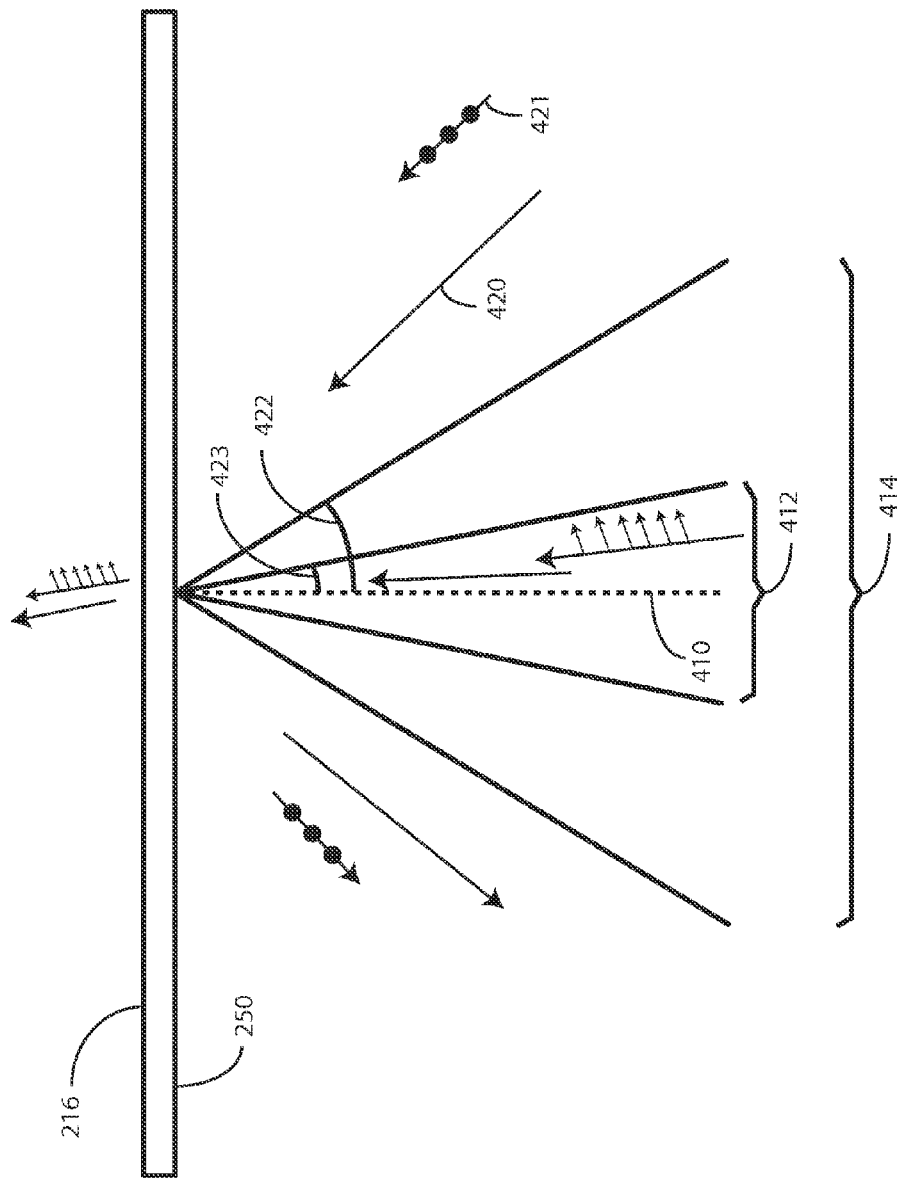
FIG. 4 is an illustrative diagram of a glare trap suitable for use as an optical relay in a compact head up display in accordance with one or more embodiments of the invention.

Turning now to FIG. 4, illustrated therein is a diagram of a glare trap 216 for an optical relay of a compact head up display in accordance with one or more embodiments of the invention. As noted above, and as shown in FIG. 4, the glare trap 216 may have a suitable optical coating disposed on a surface 250 thereof that provides angular selectivity with respect to an incident light beam.

A normal line 410, normal with respect to the surface 250 of the glare trap 216, may be designated for reference as having an angle of zero degrees. Light rays 420, 421 that are incident on the surface 250 of the glare trap 216 greater than a first angle 422 are efficiently reflected by the coating and thus are not allowed to be transmitted through glare trap 216. As noted above, the light rays can be predominantly polarized or non-polarized. Light ray 420 represents a non-polarized ray, while light ray 421 represents a predominantly s-polarized ray.

In one or more embodiments the first angle 422 is about 37 degrees. Where the incident light ray is predominantly s-polarized, such as light ray 421, this angle can be different. In either case, a cone 414 is defined such that the coating reflects any incident light rays having impinging at an angle outside the cone 414.

Likewise, the coating efficiently transmits light rays incident on surface 250 at angles less than a second angle 423. These light rays are thus transmitted through the glare trap 216. As a result, cone 412 is defined such that any incident light rays have an angle of incidence inside of cone 412 will pass through the coating. In one or more embodiments, where attention is not given to the polarization of the incident light rays, the first angle and the second angle have a separation of about 20 degrees or more. In one or more embodiments where attention is given to the polarization of light, this separation can be less, such as about ten degrees or more. As such, the scope of the claimed subject matter is not limited in this respect.

Figure 9:
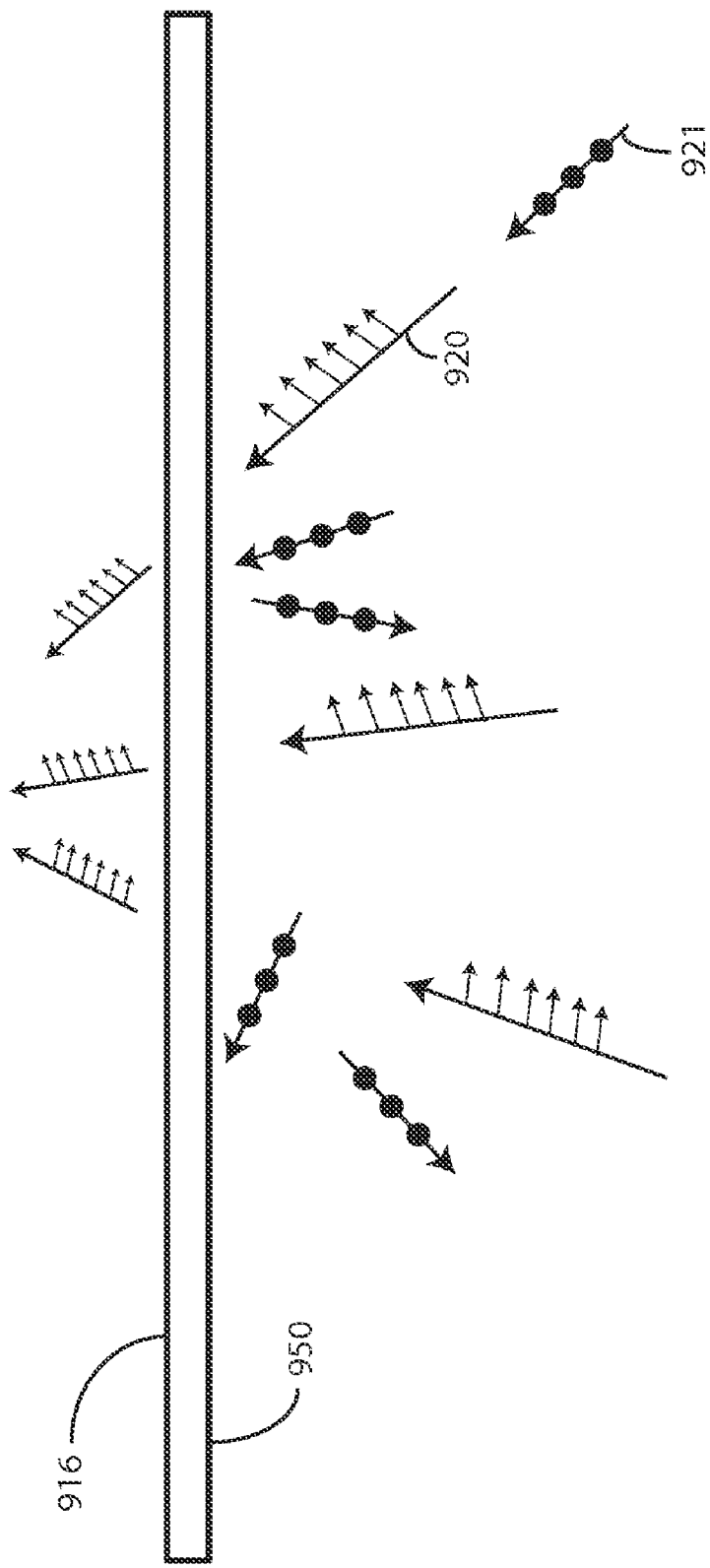
FIG. 9 illustrates a glare trap suitable for use as an optical relay in a compact head up display in accordance with one or more embodiments of the invention where a coating of the glare trap has transmission selectivity.

In another embodiment, where all light is substantially polarized, a coating can be made to reflect one polarization and transmit another. Turning briefly to FIG. 9, illustrated therein is one such embodiment.

As shown in FIG. 9, the surface 950 of the glare trap 916 has a coating that exhibits a transmission selectivity by being capable of reflecting light with a first polarization and transmitting light of a second polarization, regardless of angle of incidence.

As shown in FIG. 9, light 921 illustrates light substantially polarized in a first orientation, while light 920 illustrates light substantially polarized in a second orientation. In the illustrative embodiment of FIG. 9, light 921 is s-polarized light, while light 920 is p-polarized light. As such, the first orientation is substantially orthogonal with the second orientation.

When using substantially orthogonally polarized light, the angle of incidence can become unimportant with the proper coating on the surface 950. Specifically, when using a coating that always reflects, for example, s-polarized light, and always transmits, for example, p-polarized light, the angle of incidence for each type of light can be the same. Further, the angle of incidence for the s-polarized light, which is reflected can be less than, or greater than, the angle of incidence for the p-polarized light which is transmitted. When used in a head up display, a first optic as described above can be arranged to receive light reflected off the glare trap at a first angle of incidence, and to direct light through the glare trap at a second angle of incidence to exit the glare trap.

Note that when predominantly polarized light is used with a coating having transmission selectivity in a head up display, other optical elements may be added to the glare trap to affect polarization. For example, in the light path after the reflection and before the transmission of orthogonally polarized, redirected light, a polarization altering optical element—like a wave retarder or Faraday rotator—can be included to change the polarization from one of reflectivity to one of transmission.

As also noted above, numerous optical supply companies are capable of manufacturing an optical coating having such an angular selectivity property or a transmission selectivity property using suitable materials and/or compounds. Furthermore, such an angular selectivity property of the coating allows a single optical element, which in this embodiment is the glare trap (216), to be utilized multiple times in an optical light path of optical relay (200) or optical relay (300) to provide multiple functions in the same optical relay. For example, turning briefly to FIGS. 2 and 3, light impinges on the glare trap 216 three times in a single light path of optical relay 200 or optical relay 300.

Alternatively, other embodiments of an optical relay for a head up display may be constructed to have light incident on the glare trap 216 two times, four times, or more times in the optical path, and the scope of the claimed subject matter is not limited in this respect. Furthermore, in one or more embodiments, the glare trap 216 may be constructed to have one or more additional coatings, or the angular selective coating may be additionally formulated, to provide other optical properties or functionality, such as a polarizing coating and/or filters, and the scope of the claimed subject matter is not limited in this respect.

Figure 5:
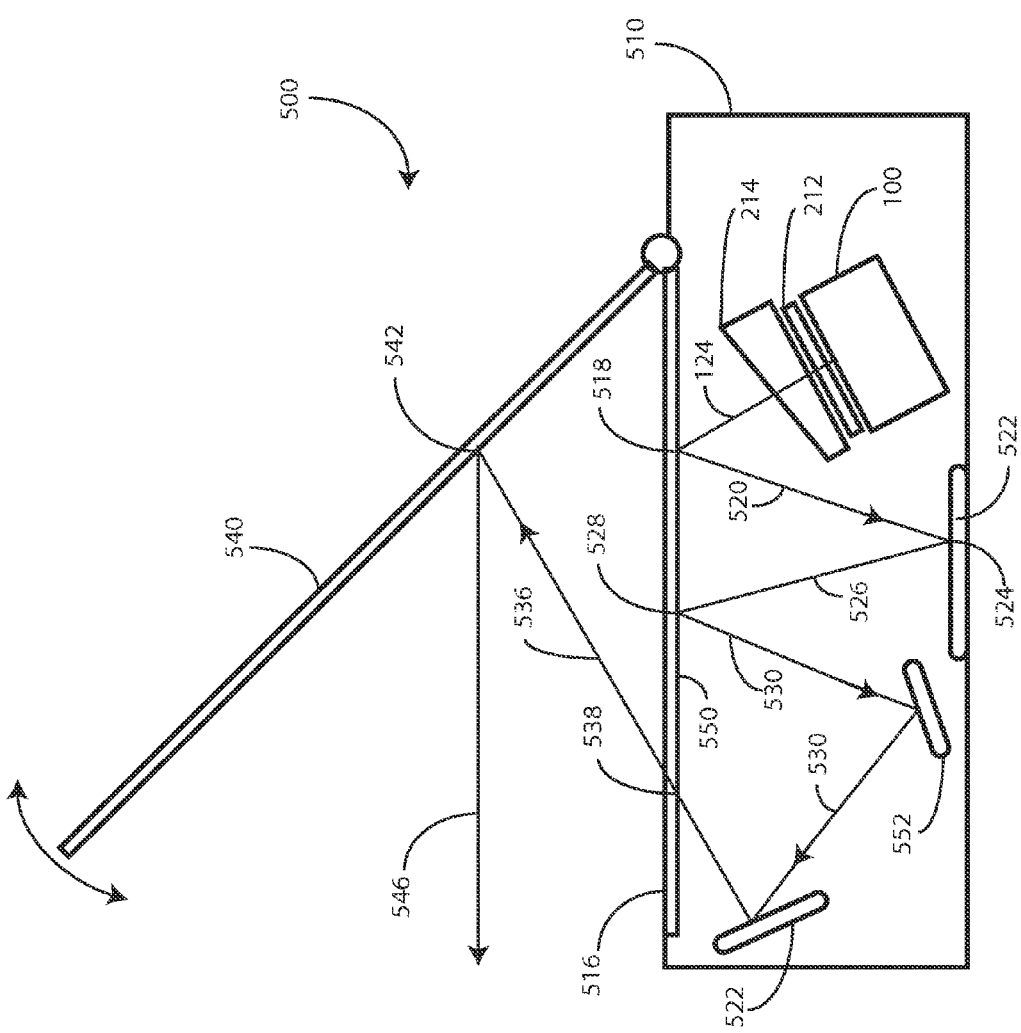
FIG. 5 is an illustrative diagram of another optical relay suitable for use in a compact head up display in accordance with one or more embodiments of the invention.

Turning now to FIG. 5, illustrated therein is an alternate embodiment of an optical relay 500 in accordance with embodiments of the invention. The embodiment of FIG. 5 is essentially the complement of the embodiments of FIGS. 2-4 in that rather than transmitting light having an angle of incidence less than a first angle and reflecting light having an angle of incidence greater than a second angle, the optical relay of FIG. 5 is configured to do the opposite—transmit light having an angle of incidence greater than a first angle and reflecting light having an angle of incidence less than a second angle. The embodiment of FIG. 5 can be used to create an optical relay having a form factor that is lower and thinner than that shown in FIGS. 2 and 3. Which embodiment to choose will be largely determined by application and the vehicle, aircraft, or other device into which the head up display will be integrated.

As illustrated in FIG. 5, as with previous figures, the optical relay 500 comprises a housing 510 in which the scanned beam display 100 may be disposed. As with previous embodiments, the scanned beam display 100 can be substituted with any of a liquid crystal display (LCD), a liquid crystal on silicon (LCOS) display, a digital light projector (DLP) display, and so on, and the scope of the claimed subject matter is not limited in this respect.

As with previous embodiments, the light or controlled output beam 124 emitted from the scanned beam display 100 may pass through a singlet lens 212 and/or a wedge 214. The singlet lens 212 may be used to ensure a flat field and/or that the eyebox is correctly positioned relative to the overall optical relay 500. The wedge 214 may be used to provide distortion correction such as correction of smile distortion and/or chromatic aberration. These components are optional and may not be used in some applications.

The controlled output beam 124 impinges on a surface 550 of the glare trap 516. The glare trap 516 may have an optical coating disposed thereon that, as in previous embodiments, functions as an angularly selective coating or filter. A suitable optical coating may comprise a multilayer, thin film, dielectric coating that includes materials such as magnesium oxide or magnesium fluoride. In certain coatings, the layers may be thicker and the layers may have indices of refraction that differ from each other by varying amounts. Coatings may also be applied to increase or enhance reflectivity as well.

In the embodiment of FIG. 5, the coating of the glare trap 516 reflects light that is incident on surface 550, in one embodiment, at less than a first angle relative to a normal line from that surface. For example, in one embodiment the angle is less than about 40 degrees from a line normal, where the line normal to the surface 550 of the glare trap 516 has a value of zero degrees. The coating of the glare trap 516 may further efficiently transmit light that is incident on the surface 550 of the glare trap 516 at angles that are greater than a second angle relative to the normal, such as an angle greater than about fifty degrees of the normal. Said differently, the coating can be configured to transmit light that is incident upon the surface 250 at an angle greater than about 50 degrees from the normal.

Note that these angles are illustrative only, as different coatings can give rise to different reflection and transmission properties. For example, in one embodiment the coating can be configured such that light incident on the surface 550 of the glare trap 516 at angles within twenty degrees of the normal are reflected, while light incident on the surface 550 of the glare trap 516 at angles greater than forty degrees are transmitted. Similarly, the coating can be set as a band-pass or band-blocking filter as well. For instance, light within twenty degrees of the normal may be reflected, as is light greater than seventy degrees of the normal. Light between thirty and sixty degrees relative to the normal is transmitted and so forth. The angles presented herein are illustrative only. The angles presented herein are not to be construed as a critical, required, or essential features or elements of any or all the claims. Embodiments of the invention are defined solely by the appended claims including any amendments made during the pendency of this application and all equivalents of those claims as issued.

In one or more embodiments where care is not given to polarization of the light beams within the optical relay 500, the first angle and the second angle have a separation of at least about 20 degrees or more. Where care is given to the polarization of the light beams, i.e., where the light being reflected and transmitted is polarized, the first angle and second angle can have a smaller separation, such as about ten degrees or more. For example, where light incident to the surface 550 at angles that are greater than the first angle are substantially s-polarized, the coating can be designed with a smaller separation angle while still functioning as an angularly selective coating or filter. This will be illustrated in FIG. 7.

Where the light incident to the surface 550 at angles that are less than the first angle is substantially s-polarized light, the light incident to the surface 550 at angles greater than the second angle can generally be either substantially p-polarized or s-polarized. Predominantly p-polarized light will be frequently be used for transmission through the glare trap 516, while predominantly s-polarized light will be used for reflection, as these polarizations lend themselves to thinner, less expensive optical coatings. Note also that where polarized light is employed, the glare trap 516 may include a polarizer integrated therein or disposed adjacent therewith.

As shown in FIG. 5, the controlled output beam 124 emitted by the scanned beam display 100 impinges on the surface 550 of the glare trap 516 at location 518. The controlled output beam 124 impinges, in the embodiment of FIG. 5, at an angle less than the first angle, which may be 40 degrees in one or more embodiments. As a result, the controlled output beam 124 is reflected off the surface 550 of the glare trap 516 as reflected beam 520, where it is directed to a secondary optic 522. The secondary optic 522 may be substantially planar. Alternatively, the secondary optic 522 may have some curvature to its shape and may comprise a curved mirror surface to provide focusing and/or magnification of the projected image. The secondary optic 522 may comprise any suitable optical element such as a mirror or a lens, and the scope of the claimed subject matter is not limited in this respect.

The reflected beam 520 impinges on the secondary optic 522 at location 524. The beam is then redirected back toward glare trap 516 as reflected beam 526. Reflected beam 526 impinges on the surface 550 of the glare trap 516 at location 528 at an angle that is greater than the first angle, and is therefore reflected by the coating on the surface 550 as reflected beam 530.

Reflected beam 530 is then directed to an alignment optic 552 for redirection to the primary optic 532. The alignment optic 552, which may comprise more than one reflective element, helps reorient the light beam so as to transform from being incident upon the surface 550 at an angle less than a first angle to being incident upon the surface 550 at an angle greater than a second angle.

Reflected and realigned beam 530 then impinges on the primary optic 532 at location 534 and is redirected back toward the glare trap 516 as light beam 536. As with the secondary optic 522, the primary optic 532 may also have a curved shape or planar shape, and in one embodiment comprises a curved mirror surface to provide focusing and/or magnification of the projected image. The primary optic 532 may comprise any suitable optical element such as a mirror or a lens, and the scope of the claimed subject matter is not limited in this respect.

As the light beam 536 impinges on the surface 550 of the glare trap 516 at location 538 at an angle equal to or greater than the second angle, which may be 70 degrees in one or more embodiments, light beam 536 is allowed to efficiently pass through the coating disposed on surface 550 of glare trap 516. Light beam 536 then exits housing 510. After the light beam 536 exits the housing 510, the light beam 536 may impinge on a combiner 540 at location 542 and be redirected toward the eye of the operator in the head up display eyebox as beam 546.

Figure 6:
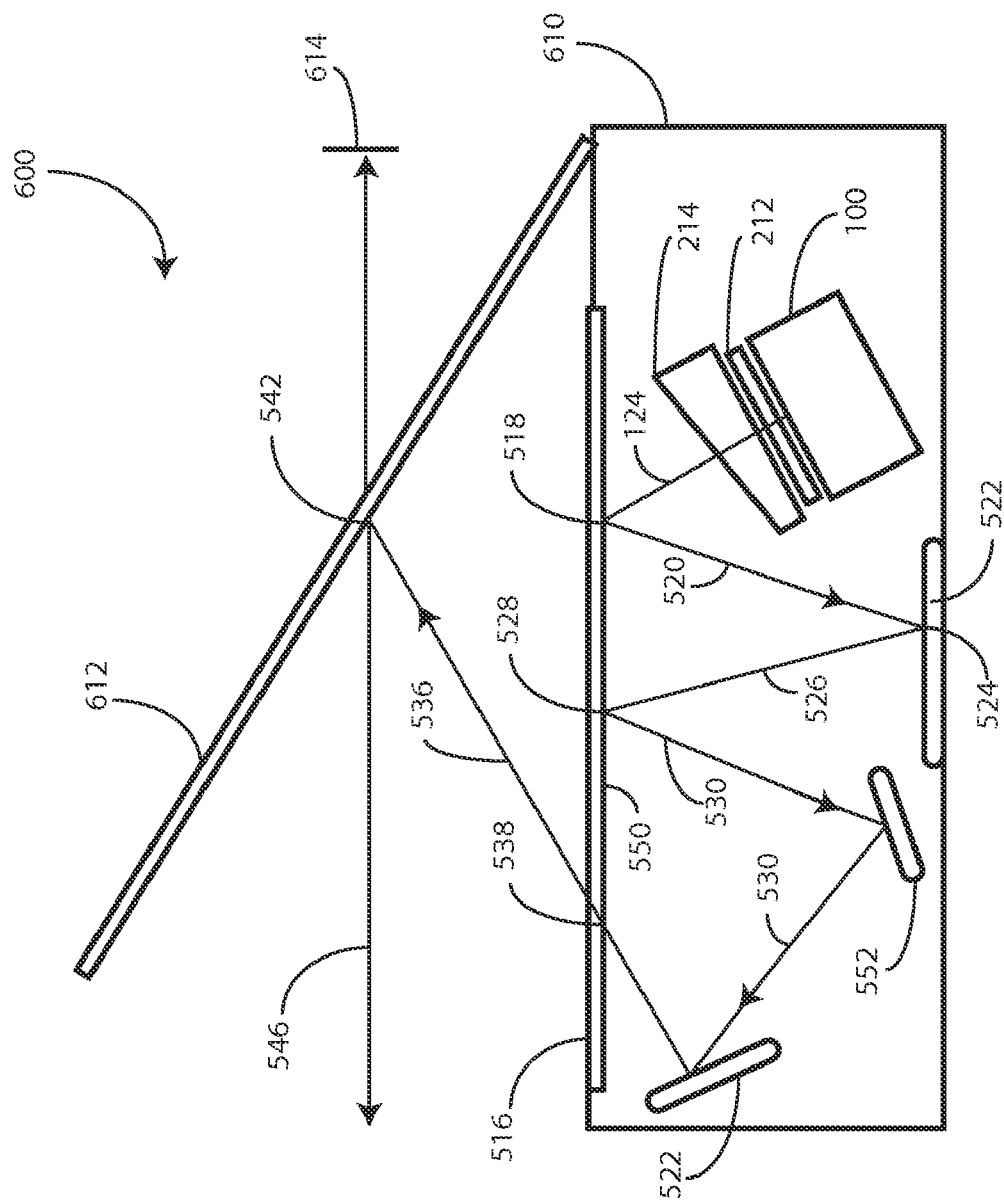
FIG. 6 is an illustrative diagram of another optical relay suitable for use in another compact head up display in accordance with one or more embodiments of the invention.

Turning now to FIG. 6, illustrated therein is a diagram of another optical relay 600 that is substantially similar to optical relay (500) of FIG. 5, except that the components of the optical relay 600 may be disposed within a dashboard 610 of the vehicle or similar location. In such a configuration, the windshield 612 of the vehicle may be function as the combiner 540 of FIG. 5, or alternatively the combiner 540 can be integrated with or otherwise disposed in or on the windshield 612.

As with the embodiment of FIG. 3, above, the optical relay 600 of FIG. 6 may function to place the apparent image 614 projected by the scanned beam display 100—via optical relay 600—at a location outside of the windshield 612. By way of example, this distance can be about 1.5 meters from the operator/viewer.

Figure 7:
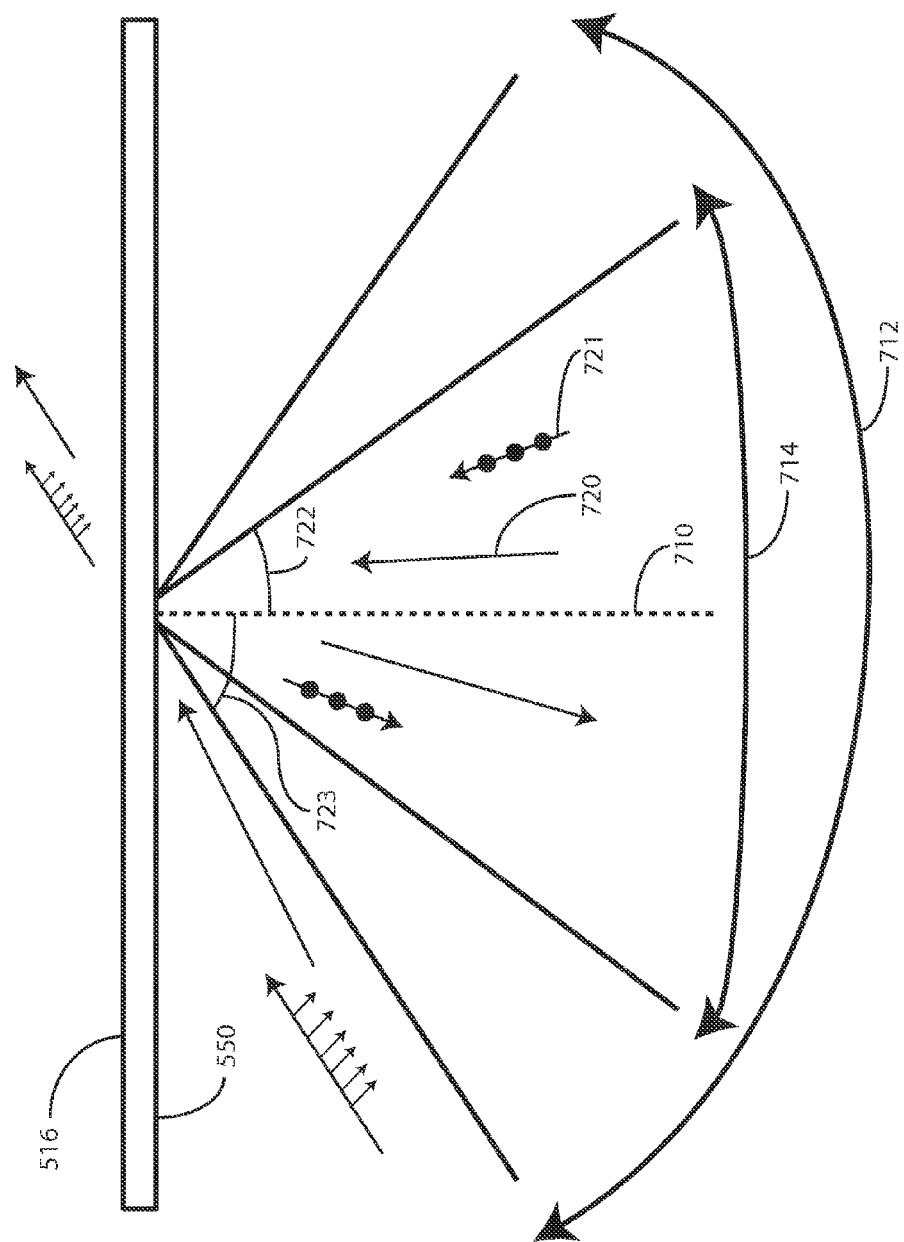
FIG. 7 is an illustrative diagram of another glare trap suitable for use as an optical relay in a compact head up display in accordance with one or more embodiments of the invention.

Turning now to FIG. 7, illustrated therein is a diagram of a glare trap 516 for an optical relay of a compact head up display in accordance with one or more embodiments of the invention. As noted above, the glare trap 516 may have a suitable optical coating disposed on a surface 550 thereof that provides angular selectivity with respect an incident light beam.

A normal line 710, normal with respect to the surface 550 of the glare trap 516, may be designated for reference as having an angle of zero degrees. Light rays 720,721 that are incident on the surface 550 of the glare trap 516 less than a first angle 722 are efficiently reflected by the coating and thus are not allowed to be transmitted through glare trap 516. As noted above, the light rays can be predominantly polarized or non-polarized. Light ray 720 represents a non-polarized ray, while light ray 721 represents a predominantly s-polarized ray.

In one or more embodiments, the first angle 722 can vary, but will frequently be on the order of 40 or 45 degrees. A cone 714 is defined such that the coating reflects any incident light rays having impinging angles within the cone 714.

Likewise, the coating efficiently transmits light rays incident on surface 550 at angles greater than a second angle 723. These light rays are thus transmitted through the glare trap 516. As a result, cone 712 is defined such that any incident light rays having an angle of incidence outside of cone 712 will pass through the coating. In one or more embodiments, where attention is not given to the polarization of the incident light rays, the first angle and the second angle have a separation of about 20 degrees or more. In one or more embodiments where attention is given to the polarization of light, this separation can be less, such as about ten degrees or more. As such, the scope of the claimed subject matter is not limited in this respect.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical relay for a head up display, the optical relay comprising:
    a glare trap having angularly selectivity arranged to reflect light having an angle of incidence less than a first angle, and transmit light having an angle of incidence greater than a second angle; and
    a first optic arranged to receive light reflected off the glare trap at an angle of incidence less than the first angle, and to direct light through the glare trap at an angle of incidence greater than the second angle to exit the glare trap, wherein the first optic operates to provide an apparent magnified image disposed at a selected distance from a viewer.

2. An optical relay as claimed in claim 1, further comprising:
    a second optic arranged to receive the light reflected off the glare trap at an angle of incidence less than the first angle a first time, and to redirect light to the first optic that is reflected off the glare trap at an angle of incidence less than the first angle a second time.

3. An optical relay as claimed in claim 1, further comprising a lens disposed between a display and the glare trap to provide a relatively flat field or to position an eyebox, or combinations thereof.

4. An optical relay as claimed in claim 1, further comprising a wedge optic disposed between a display and the glare trap to adjust optical distortion in an image projected by the display.

5. An optical relay as claimed in claim 1, wherein light is incident upon the glare trap two or more times before passing through the glare trap.

6. An optical relay as claimed in claim 1, wherein the glare trap has an optical coating disposed on a surface thereof to provide an angular selectivity of the glare trap.

7. An optical relay as claimed in claim 1, wherein the first angle is separated from the second angle by about 20 degrees or more.

8. An optical relay as claimed in claim 1, wherein the light reflected off the glare trap at the angle of incidence less than the first angle comprises predominantly s-polarized light.

9. An optical relay as claimed in claim 8, further wherein the light directed through the glare trap at the angle of incidence greater than the second angle comprises one of predominantly p-polarized light or predominantly s-polarized light.

10. An optical relay as claimed in claim 8, wherein the first angle is separated from the second angle by about 10 degrees or more.

11. An optical relay as claimed in claim 1, wherein the glare trap comprises a pane of material that is at least partially transparent to light, further wherein the pane has an optical coating disposed on a surface thereof to provide an angular selectivity to the pane.

12. A head up display, comprising:
a housing;
a display module disposed in the housing; and
an optical relay disposed in the housing, the optical relay comprising:
a glare trap having angularly selectivity arranged to reflect light emitted from the display module having an angle of incidence less than a first angle, and transmit light having an angle of incidence greater than a second angle; and
a first optic arranged to receive light reflected off the glare trap at an angle of incidence less than the first angle, and to direct light through the glare trap at an angle of incidence greater than the second angle to exit the housing through the glare trap, wherein the first optic operates to provide an apparent magnified image disposed at a selected distance from a viewer.

13. A head up display as claimed in claim 12, wherein the glare trap has an optical coating disposed on a surface thereof to provide an angular selectivity of the glare trap.

14. A head up display as claimed in claim 12, wherein the light reflected off the glare trap at the angle of incidence less than the first angle comprises predominantly a s-polarized light, further wherein the light directed through the glare trap at the angle of incidence greater than the second angle comprises one of predominantly p-polarized light or predominantly s-polarized light.

15. An optical relay for a head up display, the optical relay comprising:
a glare trap having angular selectivity arranged to reflect light having an angle of incidence greater than a first angle, and transmit light having an angle of incidence less than a second angle; and
a first optic arranged to receive light reflected off the glare trap at an angle of incidence greater than the first angle, and to direct light through the glare trap at an angle of incidence less than the second angle to exit the glare trap, wherein the first optic operates to provide an apparent magnified image disposed at a selected distance from a viewer;
wherein the light having the angle of incidence greater than the first angle comprises predominantly s-polarized light, wherein the light having the angle of incidence less than the second angle comprises one of predominantly p-polarized light or predominantly s-polarized light.

16. An optical relay as claimed in claim 15, wherein the glare trap comprises an optical coating disposed on a surface thereof to provide the angular selectivity between the first angle and the second angle, wherein the first angle is separated from the second angle by about 10 degrees or more.

17. An optical relay as claimed in claim 15, wherein the glare trap and the first optic comprises a singular piece of monolithic optical material, wherein the first optic comprises one or more surfaces of the singular piece of monolithic optical material.

18. An optical relay as claimed in claim 17, wherein at least one of the one or more surfaces comprises an optical coating disposed on a surface thereof to provide the angular selectivity to the glare trap.

19. An optical relay as claimed in claim 17, wherein at least one of the one or more surfaces comprises comprising an optical coating configured to provide greater reflectivity.

20. An optical relay for a head up display, the optical relay comprising:
a glare trap having transmission selectivity arranged to reflect light having a first polarization, and transmit light having a second polarization; and
a first optic arranged to receive light reflected off the glare trap at a first angle of incidence, and to direct light through the glare trap at a second angle of incidence to exit the glare trap, wherein the first optic operates to provide an apparent magnified image disposed at a selected distance from a viewer;
wherein the light having the first angle of incidence comprises light substantially polarized in a first orientation, wherein the light having the second angle of incidence comprises light substantially polarized in a second orientation;
wherein the first orientation and the second orientation are substantially orthogonal.

21. The optical relay of claim 20, wherein the light polarized in the first orientation comprises predominantly s-polarized light, further wherein the light polarized in the second orientation comprises predominantly p-polarized light.

22. The optical relay of claim 21, wherein the first angle of incidence and the second angle of incidence are the same.

23. The optical relay of claim 21, wherein the first angle of incidence is less than the second angle of incidence.

24. The optical relay of claim 21, wherein the first angle of incidence is greater than the second angle of incidence.

* * * * *